July 25, 1933.  G. W. LORIMER  1,919,894
GAS REGULATOR
Filed Sept. 20, 1929
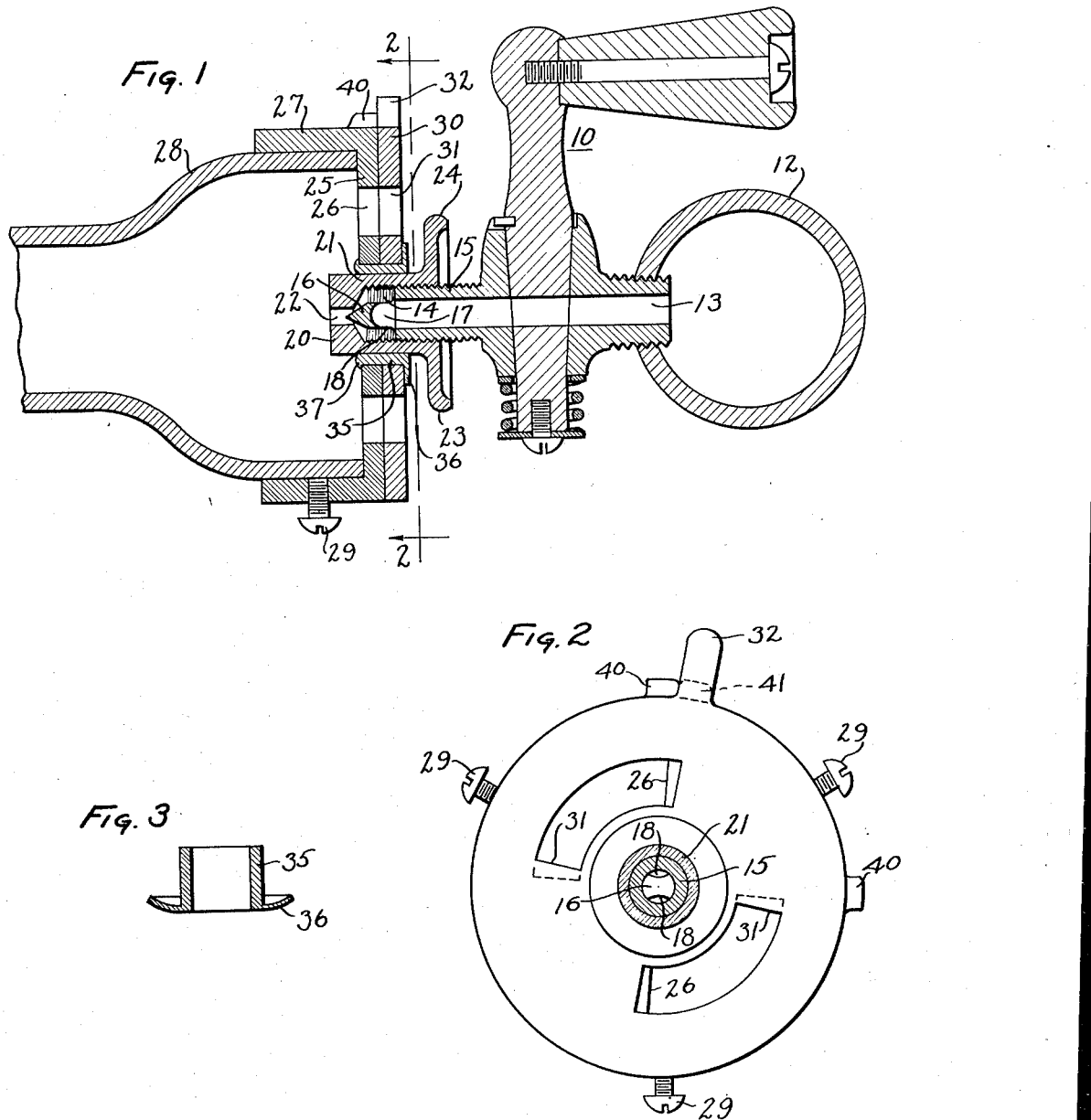

Patented July 25, 1933

1,919,894

UNITED STATES PATENT OFFICE

GEORGE W. LORIMER, OF TROY, OHIO, ASSIGNOR, BY MESNE ASSIGNMENTS, TO BLACK PRODUCTS COMPANY, OF CHICAGO, ILLINOIS, A CORPORATION OF ILLINOIS

GAS REGULATOR

Application filed September 20, 1929. Serial No. 393,939.

This invention relates to adjustable gas valves.

One of the principal objects of the invention is to provide a valve which may be very easily adjusted manually to properly proportion the flow of different gases.

Another object of the invention is to provide a gas regulating valve which is cheaply constructed and made of comparatively few simple parts.

Other objects and advantages of the invention will be apparent from the following description and from the accompanying drawing, in which—

Fig. 1 is a vertical section through a mixing valve;

Fig. 2 is a section on the line 2—2 of Fig. 1;

Fig. 3 is a detail in section of the clamping sleeve before being assembled into the valve.

Referring more particularly to the drawing, in which the invention is shown as applied to a fuel regulating device for gas stoves or the like, and in which corresponding numerals designate like parts in the various views, the numeral 10 designates generally a gas stop cock in threaded engagement with a fuel manifold 12 which is attached to some suitable supply of gaseous fuel. Gaseous fuel under pressure within the manifold may pass through the stop cock by means of the passage 13 provided through the member 10, thence into a small compartment 14 within a fuel admission and regulating valve at the end 15 of the valve 10. A cone pointed valve member 16 is attached to the end 15 of the cock by means of a yoke 17 providing openings 18 which permit the fuel to flow from the end of the passage 13 into the compartment 14. The cock end 15 is externally threaded and threaded upon it is the fuel admission or regulating valve 20 which is made up of a sleeve portion 21 having at one end an opening 22 which registers with the cone shaped valve member 16. The opposite end of the member 20 is provided with means for easily effecting the manual adjustment of the member. The adjusting means is shown as an outwardly extending annular flange 23 by which the valve member 20 can be adjusted upon the member 15 by the fingers of the operator without the use of tools. This adjustment changes the degree of opening between the parts 16 and 22 and thus controls or regulates the amount of fuel passing through the opening 22 for mixture with air. The flange 23 is preferably provided with a knurled rim 24 to provide easy and quick adjustment of the valve member 20 so that the proportions of the gas and air may be always maintained at the proper value.

An air admission valve is positioned upon the sleeve portion 21 of the valve 20 and comprises a stationary disk shaped member 25 which is provided with one or more slots 26 preferably extending annularly. A peripheral flange 27 is shown extending laterally from the member 25 to provide a joint or support for the bell shaped mixing chamber 28 of the burner or other device to which the valve may be attached. The attachment of the flange 27 to the walls of the chamber 28 may be through the use of clamping screws 29, or these parts may be cemented or otherwise attached together. Contacting with the stationary member 25 on the side opposite the flange 27 is a disk shaped rotatable member 30 generally similar to the member 25 and having annular slots 31 similar to the slots 26. The slots 31 are positioned so that they may be aligned with the slots 26 to permit the admission of air to the mixing chamber 28 through openings of varying size. A projection 32 on the member 30 provides means for grasping the rotatable member in order to move it with respect to the stationary part for the purpose of adjusting the degree of opening between the slots 26 and 31 without the use of tools.

The two air admission valve members, which are preferably castings of aluminum or the like and are finished to provide smooth surfaces adjacent each other, are held in contact with one another under tension by means of an aligning hub or clamping sleeve 35 which is provided with a convex or curved clamping flange 36 at one end. This disk shaped flange is positioned on the end of the sleeve so that the flange edge extends backwardly towards the sleeve portion of the aligning hub. The two valve members are assembled to the clamping sleeve and pressure is applied to the flange end of the sleeve so that the dished or curved flange portion 36 is flattened against the side of the member 30. The end 37 of the sleeve, which is opposite the flange end 36, is then expanded by spinning or by some other process so that the cup shaped flange portion will remain flat and will thus be stressed under tension to yieldingly hold the two valve members in frictional engagement.

The stationary member 25 is provided with a pair of spaced projections 40 extending outwardly from the rim of the disk shaped portion of the member. The rotatable member 30 is provided with a projection 41 extending outwardly from the rim of that member and overlapping the rim of the stationary member so that movement of the rotatable member will be limited by the projection 41 engaging one or the other of the projections 40. The projections 40 are so spaced that the travel of the member 30 will be limited to a degree sufficient to permit complete registration of the annular slots 26 and 31 at one end of the movement of the rotatable member and a complete separation of the adjacent slots at the other end of the movement. Thus any degree of opening may be instantly provided and the quantity of air entering the mixing chamber may be accurately controlled without the use of tools and without mechanically locking the adjustable member 30.

In burning gaseous fuels it is very necessary that the correct proportion of fuel and air should be admitted to the mixing chamber in order to secure complete combustion. Where fuels of varying heat value are used it becomes necessary to frequently adjust the ratio of air and fuel. In this valve means are provided which will permit the accurate control of both fuel and air to provide the correct mixture for complete combustion and this means is so easily operated merely by the user's fingers that the user will be inclined to frequently make the adjustments that are necessary to provide the correct combustible mixture of gas and air; which he would not be inclined to do if the use of tools were required to make the adjustment.

While the form of apparatus herein described, constitutes a preferred embodiment of the invention, it is to be understood that the invention is not limited to this precise form of apparatus, and that changes may be made therein without departing from the scope of invention which is defined in the appended claims.

What is claimed is:

1. In a gas mixing device of the class described, a stop cock provided with an inlet and an outlet passage, a regulating valve in threaded engagement with said outlet passage, said regulating valve comprising a threaded sleeve portion and an outwardly extending disk-like member of a diameter several times larger than the threaded part of said sleeve portion, an air admission valve including a stationary member, a rotatably adjustable member, an aligning hub supported on the sleeve portion of said regulating valve and adapted to hold said stationary and rotatable members in contact, a slot in each of said members, said slots adapted to be brought into registration upon movement of said rotatable member, and means adapted to be operated merely by the fingers for adjusting said rotatable member.

2. In a gas mixing device of the class described, a stop cock provided with an inlet and an outlet passage, a gas regulating valve in threaded engagement with said outlet passage, said gas regulating valve comprising a threaded sleeve portion and an outwardly extending disk-like adjusting member of a diameter several times larger than the threaded part of said sleeve portion, an air admission valve, said air admission valve comprising a stationary member, a rotatable member, an aligning hub supported on the sleeve portion of said fuel regulating valve and adapted to hold said stationary and rotatable members in frictional engagement, a slot in each of said members, said slots adapted to be brought into registration upon movement of said rotatable member, spaced projections on one of said members, a projection on the other of said members adapted to alternately engage said spaced projections to limit the travel of the rotatable member, and a radially extending finger operated projection on said rotatable member to provide for the movement thereof.

3. In a gas mixing device of the class described, a stop cock provided with an inlet and an outlet, a manually adjustable fuel admission valve including a sleeve portion, an adjustable air admission valve, said air admission valve comprising a stationary member, a rotatable member, and an aligning hub supported on the sleeve portion of said fuel admission valve and adapted to hold said stationary and rotatable members yieldingly in frictional engagement, said hub comprising a tubular portion extending through said members, a curved flange at one end of said tubular portion engaging a side of one of said members and having a headed end engaging a side of the other of said members to hold the members in frictional engagement under tension of said curved flange.

GEORGE W. LORIMER.